Feb. 24, 1953 F. BUDRECK 2,629,286
REARVIEW MIRROR STRUCTURE
Filed Sept. 7, 1950
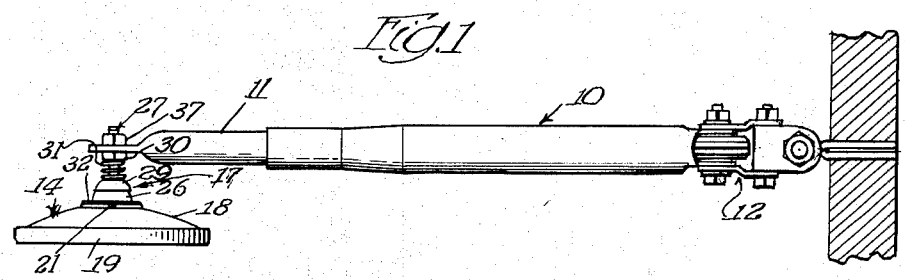
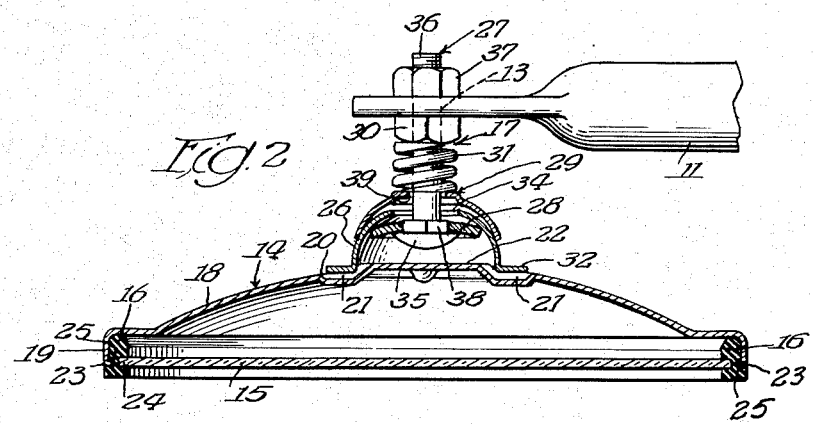
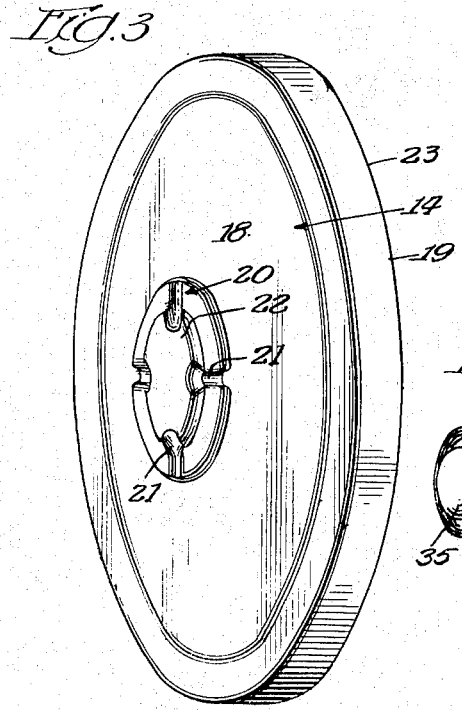
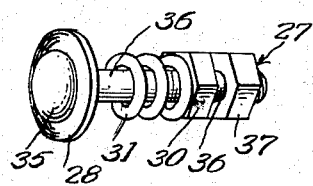
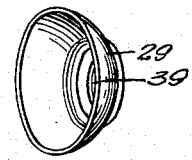
Inventor
Frances Budreck
By: Fred Gerlach
Atty.

Patented Feb. 24, 1953

2,629,286

UNITED STATES PATENT OFFICE 2,629,286

REARVIEW MIRROR STRUCTURE

Frances Budreck, Chicago, Ill., assignor to Monarch Tool & Machinery Co., Chicago, Ill., a corporation of Illinois Application September 7, 1950, Serial No. 183,516

4 Claims. (Cl. 88—98)

The present invention relates generally to rear view mirror structures. More particularly the invention relates to that type of rear view mirror structure which is adapted to be mounted on the exterior of the body of a truck or like vehicle by way of a conventional arm variety bracket, affords the driver of the truck an opportunity while driving to view objects behind or rearwards of the truck, and as its principal components comprises a one-piece stamped metal cup-shaped shell in the form of a forwardly bulged crosswall and a continuous rearwardly extending side wall around the marginal portion of the crosswall, a resiliently mounted mirror plate extending across the space within the continuous side wall, and a universal joint between the central portion of the crosswall of the shell and the outer end of the arm variety bracket for permitting the shell together with the mirror plate to be angularly adjusted to a limited extent relatively to the bracket.

As evidenced by United States Letters Patent No. 2,498,065 granted to me on February 21, 1950, it has heretofore been proposed in connection with a rear view mirror structure of the aforementioned type to utilize or employ as the universal joint between the cup shaped shell and the outer end of the arm variety bracket the following parts: (1) an elongated element, one end of which extends through a hole in the outer end of the bracket and has an external screw thread and nut type clamping means for fixedly connecting it to the outer end of the bracket, and the other end of which is in the form of a comparatively large ball which is disposed for the most part within the interior of the shell and has its outer portion extending through a circular opening in the central portion of the shell crosswall; and (2) a pair of complemental juxtapositioned ring shaped members which are secured by rivets or screws to the opening defining portion of the crosswall of the shell and have the inner marginal portions thereof shaped to form oppositely extending socket forming flanges in which the central portion of the ball is movably mounted. In practice it has been found that a rear view mirror structure having a universal joint of such character is subject to the objection that rain and other water accumulate within the shell interior as a result of flowing inwards through the circular opening in the central portion of the shell crosswall and also between the ball and the socket forming flanges on the inner marginal portions of the complemental juxtapositioned ring shaped members. When water collects or accumulates within the interior of the shell it either deteriorates the mirror finish or coating on the inner surface of the mirror plate or, if subjected to freezing, cracks the plate, thus necessitating or requiring costly replacement of the latter.

The primary object of this invention is to provide a rear view mirror structure of the type under consideration which is an improvement upon, and eliminates the objections to, previously proposed structures and is characterized by the fact that the crosswall of the shell is entirely imperforate and the universal joint between the central portion of the crosswall and the outer end of the arm variety bracket is disposed wholly exteriorly of the shell and hence there can be no accumulation of water within the shell and resultant spoilage or breakage of the mirror plate that extends across the space within the continuous side wall of the stamped metal shell.

Another object of the invention is to provide a rear view mirror structure of the last mentioned character in which the universal joint whereby the cup-shaped shell together with the mirror plate is mounted for angular adjustment into different positions relatively to the arm variety bracket, comprises a hollow, substantially hemispherical member which extends forwards from the central portion of the crosswall of the shell, has a comparatively large circular opening in its apex portion and embodies an integral outwardly extending marginal flange in abutting and welded relation with said central portion of the shell crosswall, and a bolt which extends through the opening in the apex portion of the substantially hemispherical member, has the head thereof disposed within the member, and embodies directly forwards of the head an outer cup-shaped washer in sliding engagement with the outer surface of the portion of the member that defines the central opening.

Another object of the invention is to provide a rear view mirror structure of the type and character under consideration in which the central portion of the crosswall of the shell is provided with a flat forwardly projecting ring shaped boss against which fits flatly and is welded the outwardly extending flange on the marginal portion of the hollow substantially hemispherical member of the universal joint.

Another object of the invention is to provide a rear view mirror structure of the last mentioned character in which the portion of the shell crosswall that is within the forwardly projecting ring shaped boss is forwardly offset with respect to the boss so that it serves as a piloting or centering medium for the hollow substantially hemispherical member in connection with welding of the latter in place.

Another object of the invention is to provide a rear view mirror structure of the type heretofore mentioned in which the forwardly projecting boss on the central portion of the shell crosswall has radially extending grooves formed in it in order to permit drainage of any water that accumulates within the hemispherical member of the universal joint.

A further object of the invention is to provide a rear view mirror structure of the aforementioned type and character in which the universal joint includes a nut which is mounted on the central portion of the shank of the bolt and forms a part of the clamping means whereby the front end of the shank of the bolt is connected to the outer end of the arm variety bracket, and also includes a spiral compression spring which extends around the central portion of the shank of the bolt, is interposed between the aforementioned nut and the outer cup-shaped washer, and serves with the nut yieldingly to maintain the outer cup-shaped washer in sliding engagement with the outer surface of the opening equipped apex portion of the hollow substantially hemispherical member.

A still further object of the invention is to provide a rear view mirror structure which effectively and efficiently fulfills its intended purpose, may be manufactured at a low or reasonable cost and possesses a comparatively long life because of the particular protection to which the mirror plate is subjected.

Other objects of the invention and the various advantages and characteristics of the present rear view mirror structure will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a plan view showing a rear view mirror structure embodying the invention connected to the cab of an automotive truck by way of a conventional arm variety bracket;

Figure 2 is an enlarged horizontal section of the mirror structure illustrating in detail the construction and design of the exteriorly positioned universal joint whereby the one-piece stamped metal cup-shaped shell together with the mirror plate can be angularly adjusted to a limited extent relatively to the bracket;

Figure 3 is a front perspective of the shell showing the design and arrangement of the flat forwardly projecting ring shaped boss to which is welded the outwardly extending flange on the marginal portion of the hollow substantially hemispherical member of the universal joint;

Figure 4 is a rear perspective of the hemispherical member;

Figure 5 is a rear perspective of the assembly of bolt, inner cup-shaped washer, compression spring and adjusting nut constituting a part of the universal joint for adjustably supporting the mirror plate equipped shell with respect to the conventional arm variety bracket; and Figure 6 is a rear perspective of the outer cup-shaped washer of the universal joint.

The rear view mirror structure which is shown in the drawing constitutes the preferred form or embodiment of the invention. It is adapted to be located exteriorly of the cab of a truck or like vehicle and serves as a medium or instrumentality for permitting the truck driver or operator to view objects in back of the truck. A conventional arm variety bracket 10 serves to connect the mirror structure to the cab of the truck to which the structure is applied. As shown in Figure 1, the bracket 10 comprises an outwardly extending extensible arm 11 and a linkage arrangement 12. The arm 11 normally extends outwards from the cab of the truck and consists of a pair of telescopically connected arm members in order that its over-all length may be increased or decreased for purposes of properly positioning the rear view mirror structure. The outer end of the outer arm member of the arm is provided with a transverse hole 13. The linkage arrangement 12 is located at the inner end of the inner arm member. It serves to connect the arm 10 to one of the door hinges on the cab of the truck and may be of standard design or construction or like that of pending United States patent application Serial No. 143,238, filed by me on February 9, 1950, and entitled "Bracket Structure For Pivotally Supporting a Rear View Mirror Carrying Arm." It is contemplated that the linkage arrangement 12 of the arm variety bracket 10 will permit the arm 11 to be swung forwards and rearwards and also up and down. The rear view mirror structure is located at the outer end of the outer arm member of the extensible arm 10 and comprises a cup-shaped shell 14, a mirror plate 15, a mounting ring 16 and a universal joint 17.

The shell 14 is in the form of a one-piece sheet metal stamping and is preferably of circular configuration, although, if desired, it may be polygonal or oval. It serves as a housing and support for the mirror plate 15 and consists of a circular crosswall 18 and a cylindrical side wall 19. The crosswall 18 of the shell is entirely imperforate and all portions thereof, with the exception of the outer marginal portion, are bulged forwardly, i. e., in the direction of forward travel of the truck to which the rear view mirror structure is applied. The central portion of the shell crosswall 18 is shaped to form a flat forwardly projecting ring shaped boss 20. The latter has in the outer surface thereof a plurality of radially extending grooves 21, as best shown in Figure 3 of the drawing. Preferably there are four grooves and these are disposed 90° apart. The sheet metal within the flat ring shaped boss 21 is out-struck or forwardly offset with respect to the outer surface of the boss and forms a circular piloting or centering portion 22. The purpose or function of the boss 20 and the piloting portion 22 will be described in detail hereafter. The cylindrical side wall 19 of the shell 14 is connected to, and extends rearwards from, the outer marginal portion of the crosswall 18 and embodies on its rear or free margin a continuous inwardly extending flange 23.

The mirror plate 15 of the rear view mirror structure is in the form of a flat disc and consists of a circular piece of glass and an inner coating of standard mirror forming material. It extends across the space within the cylindrical side wall 19 of the shell and constitutes a reflecting surface whereby the driver of the truck when looking towards it may see rearwards.

The mounting ring 16 is continuous and fits snugly within the rearwardly extending cylindrical side wall 19 of the shell. It is formed of rubber or like elastic and resilient material and embodies an internal annular groove 24 in which the marginal portion of the mirror plate 15 fits tightly. The outer periphery of the ring embodies an annular seat forming groove 25 in which the inwardly extending flange 23 on the rear or free margin of the shell side wall is seated. If desired, the mounting ring 16 may be like that which is disclosed in, and forms the subject matter of, aforementioned United States Letters Patent No. 2,498,065.

The universal joint 17 of the rear view mirror structure extends between the central portion of the shell crosswall 18 and the outer end of the outer arm member of the arm 11 of the conventional arm variety bracket 10 and serves as a medium whereby the shell together with the mirror plate is permitted to be angularly adjusted to a limited extent. It is disposed wholly exteriorly of the shell 14 and comprises a substantially hemispherical member 26, a bolt 27, an inner cup-shaped washer 28, an outer cup-shaped washer 29, an adjusting nut 30 and a spiral compression spring 31. The hemispherical member 26 is in the form of a one-piece sheet metal stamping and is positioned directly in front of the central portion of the shell crosswall and so that its apex portion extends or faces forwards. The inner periphery of the marginal portion of the hemispherical member 26 has substantially the same diameter as, and is in surrounding relation with, the piloting portion 22 of the shell crosswall 18. Said marginal portion of the member 26 is provided with an integral flat outwardly extending flange 32 and this is shaped conformably to, and fits flatly against, the outer surface of the ring shaped boss 20 and is secured to the latter by spot welds 33. There are preferably four spot welds and these are disposed 90° apart and are positioned midway between the radially extending grooves 21. In connection with welding of the substantially hemispherical member 26 to the crosswall of the shell 14 the member is properly positioned with respect to the shell crosswall and then the spot welds 33 are formed. In connection with the spot welding operations the piloting or centering portion 22 of the shell crosswall holds the member 26 against lateral displacement. The radially extending grooves 21 in the outer surface of the ring shaped boss 20 effect communication between the interior of the hemispherical member 26 and atmosphere and permit any water that accumulates within the member to drain therefrom. The apex portion of the member 26 is provided with a comparatively large circular opening 34. The bolt 27 of the universal joint 17 consists of a head 35 and a screw threaded shank 36 and, as shown in Figure 2 of the drawing, is arranged so that the shank extends through the circular opening 34 in the apex portion of the hemispherical member 26 and its head 35 is disposed within the interior of the member. The front end of the shank 36 of the bolt 27 extends through the transverse hole 13 in the outer end of the outer arm member of the extensible arm 11 and is provided with a clamp nut 37 which together with the adjusting nut 30 serves releasably but securely to secure the front end of the bolt shank 36 to the outer end of said outer arm member of the arm 11. The diameter of the shank of the bolt is materially less than the diameter of the circular opening 34 in the apex portion of the member 26 in order that the member together with the mirror plate equipped shell 14 is permitted to rock or tilt in different directions relatively to the bolt. The head 35 of the bolt 27 is connected to the rear end of the shank by a polygonal connecting part 38. The inner cup-shaped washer 28 surrounds the head end of the bolt 27 and is disposed in the interior of the substantially hemispherical member 26. It has a central polygonal hole in which the polygonal connecting part 38 of the bolt 27 fits snugly and embodies a rearwardly curved outer margin which is in sliding engagement with the portion of the member 26 that defines and extends around the central opening 34. If desired, the inner washer 28 may be other than cup-shaped and formed integrally with the head 35 of the bolt 27. The outer cup-shaped washer 29 of the universal joint surrounds the central portion of the shank of the bolt 27 and is arranged so that it extends rearwards and the outer margin thereof is in sliding engagement with the outer surface of the portion of the member 26 that defines and extends around the central opening 34. It has a central hole 39 through which extends the central portion of the shank 36 of the bolt. The nut 30 is mounted on the shank of the bolt at a point a small distance forwards of the outer cup shaped washer 29. The spiral compression spring 31 surrounds the central portion of the shank of the bolt 27 and is interposed between, and abuts against, the adjusting nut 30 and the inner marginal portion of the outer cup-shaped washer 29. When the nut 30 is tightened so as to compress the spring 31 the latter serves firmly to clamp the inner and outer cup-shaped washers 28 and 29 against the portion of the hemispherical member 26 that extends around the central opening 34. It is contemplated that the clamping action of the cup-shaped washers will not be sufficient to preclude the member 26 from being rocked into different positions with respect to the washers in connection with angular adjustment of the mirror plate equipped shell 14. When it is desired to adjust the tension of the spiral compression spring 31 the nut 37 is loosened. This frees the adjusting nut 30 so that it may be tightened or loosened as desired. After proper positioning of the adjusting nut 30 the nut 37 is tightened so as firmly to clamp the outer end of the outer arm member of the arm 11 between the two nuts.

The herein described rear view mirror structure effectively and efficiently fulfills its intended purpose and is characterized by the fact that the universal joint 17 permitting angular adjustment of the mirror plate equipped cup-shaped shell 14 is disposed wholly exteriorly of the shell. By so disposing the universal joint it is possible to make the shell 14 completely imperforate and thus prevent accumulation within the shell of water which would have a deleterious effect on the mirror plate. Due to the particular construction and manner of mounting of the universal joint the rear view mirror structure as a whole is capable of being produced or fabricated at a low or reasonable cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a rear view mirror structure adapted to be connected by a bracket to a vehicle and comprising a one-piece stamped metal cup-shaped shell consisting of a completely imperforate crosswall with an integral outwardly extending flat circular boss on its central portion, and a continuous side wall connected to the marginal portion of the crosswall, a mirror plate extending across the space within the side wall and having its marginal portion in sealed relation with said side wall, and an exteriorly disposed universal joint extending between the shell crosswall and the bracket, operative to support the shell together with the mirror plate for angular adjustment in different directions, and embodying a hollow substantially hemispherical one-piece stamped metal member formed separately from the shell, disposed adjacent, and having the apex portion thereof projecting away from, the central portion of the shell crosswall, having an opening in its apex portion, and provided at its marginal portion with an integral outwardly extending right angle flange that is shaped conformably to, fits directly and flatly against, and is welded to, the outer surface of said boss, a head and shank type bolt extending loosely through said opening in the apex portion of the hollow member, having the head end thereof disposed within said member, and provided at the outer end of its shank with means for attachment to the bracket, an outer cup-shaped washer mounted on, and extending around the shank of the bolt and arranged in sliding engagement with the outer surface of the portion of the hollow member that defines the central opening, and means on the shank of the bolt for yieldingly maintaining said outer cup-shaped washer in sliding engagement with said outer surface of the last mentioned portion of the hollow member.

2. As a new article of manufacture, a rear view mirror structure adapted to be connected by a bracket to a vehicle and comprising a one-piece stamped metal cup-shaped shell consisting of a completely imperforate crosswall having an integral outwardly extending flat ring shaped boss on its central portion and in addition having the metal within the boss outwardly offset to form a piloting portion, and a continuous side wall connected to the marginal portion of the crosswall, a mirror plate extending across the space within the side wall and having its marginal portion in sealed relation with said side wall, and an exteriorly disposed universal joint extending between the shell crosswall and the bracket, operative to support the shell together with the mirror plate for angular adjustment in different directions, and embodying a hollow substantially hemispherical one-piece stamped metal member formed separately from the shell, disposed adjacent, and having the apex portion thereof projecting away from, the central portion of the shell crosswall, embodying an opening in its apex portion, and having its outer marginal portion extending closely around, and in interlocked relation with, said piloting portion and provided with an integral outwardly extending right angle flange that is shaped conformably to, fits directly and flatly against, and is welded to, the outer surface of said boss, a head and shank type bolt extending loosely through said opening in the apex portion of the hollow member, having the head end thereof disposed within said member, and provided at the outer end of its shank with means for attachment to the bracket, an outer cup-shaped washer mounted on, and extending around, the shank of the bolt and arranged in sliding engagement with the outer surface of the portion of the hollow member that defines the central opening, and means on the shank of the bolt for yieldingly maintaining said outer cup-shaped washer in sliding engagement with the outer surface of the last mentioned portion of the member.

3. As a new article of manufacture, a rear view mirror structure adapted to be connected by a bracket to a vehicle and comprising a one-piece stamped metal cup-shaped shell consisting of a completely imperforate crosswall with an integral outwardly extending flat circular boss on its central portion, and a continuous side wall connected to the marginal portion of the crosswall, a mirror plate extending across the space within the side wall and having its marginal portion in sealed relation with said side wall, and an exteriorly disposed universal joint extending between the shell crosswall and the bracket, operative to support the shell together with the mirror plate for angular adjustment in different directions, and embodying a hollow substantially hemispherical one-piece stamped metal member formed separately from the shell, disposed adjacent, and having the apex portion thereof projecting away from, the central portion of the shell crosswall, having an opening in its apex portion, and provided at its outer marginal portion with an integral outwardly extending right angle flange that is shaped conformably to, fits directly against, and is welded to, the outer surface of said boss, a head and shank type bolt extending loosely through said opening in the apex portion of the hollow member, having the head end thereof disposed within said hollow member, provided at the outer end of its shank with means for attachment to the bracket, and having a continuous outwardly extending member associated with its head, an outer cup-shaped washer mounted on, and extending around, the shank of the bolt and arranged so that it and said continuous outwardly extending member are in cooperative relation and sliding engagement with the portion of the hollow member that defines the central opening, and spring means on the shank of the bolt for clamping said outer cup-shaped washer and said outwardly extending member against the last mentioned portion of the hollow member, said boss having an outwardly facing radial groove in its lower portion for draining any water that accumulates in the interior of said hollow member.

4. As a new article of manufacture, a rear view mirror structure adapted to be connected by a bracket to a vehicle and comprising a cup-shaped shell consisting of a crosswall and a continuous side wall connected to the marginal portion of the crosswall, a mirror plate extending across the space within the side wall and having its marginal portion in sealed relation with said side wall, and an exteriorly disposed universal joint extending between the shell crosswall and the bracket, operative to support the shell together with the mirror plate for angular adjustment in different directions, and embodying a hollow substantially hemispherical member disposed adjacent, and having the apex portion thereof projecting away from, the central portion of the shell crosswall, embodying an opening in its apex portion, and having its outer marginal portion connected fixedly to said central portion of the shell crosswall, a head and shank type bolt extending loosely through said opening in the apex portion of the hollow member, having the head end thereof disposed within said member, provided at the outer end of its shank with means for attachment to the bracket and having a continuous outwardly extending member associated with its head, an outer cup-shaped washer mounted on, and extending around, the shank of the bolt and arranged so that it and said outwardly extending member are in cooperative relation and sliding engagement with the portion of the hollow member that defines the central opening, and means for clamping said outer cup-shaped washer and said outwardly extending member against the last mentioned portion of the hollow member, consisting of a nut mounted on the central portion of the shank of the bolt and forming a part of the bolt attaching means, and a spiral compression spring extending around the shank of the bolt and having one end thereof in abutment with said nut and its other end in abutment with the central portion of the outer cup-shaped washer, said nut being adapted when turned relatively to the shank of the bolt to vary the compression of the spring.

FRANCES BUDRECK.

REFERENCES CITED

The following references are of record in the file of this patent:

UNITED STATES PATENTS

| Number | Name | Date |
| --- | --- | --- |
| 1,175,505 | Boye | Mar. 14, 1916 |
| 1,537,039 | Short | May 5, 1925 |
| 1,558,641 | Short | Oct. 27, 1925 |
| 2,452,316 | Morley | Oct. 26, 1948 |

FOREIGN PATENTS

| Number | Country | Date |
| --- | --- | --- |
| 486,346 | Great Britain | June 2, 1938 |
| 525,988 | Great Britain | Sept. 9, 1940 |